(12) United States Patent
Takatake

(10) Patent No.: US 11,458,552 B2
(45) Date of Patent: Oct. 4, 2022

(54) ROTATING TOOL

(71) Applicant: KYOCERA Corporation, Kyoto (JP)

(72) Inventor: Yuusaku Takatake, Higashiomi (JP)

(73) Assignee: KYOCERA CORPORATION, Kyoto (JP)

( * ) Notice: Subject to any disclaimer, the term of this patent is extended or adjusted under 35 U.S.C. 154(b) by 84 days.

(21) Appl. No.: 16/498,463

(22) PCT Filed: Mar. 20, 2018

(86) PCT No.: PCT/JP2018/011052
§ 371 (c)(1),
(2) Date: Sep. 27, 2019

(87) PCT Pub. No.: WO2018/180775
PCT Pub. Date: Oct. 4, 2018

(65) Prior Publication Data
US 2021/0187632 A1    Jun. 24, 2021

(30) Foreign Application Priority Data

Mar. 30, 2017 (JP) .............................. JP2017-066665

(51) Int. Cl.
*B23C 5/10* (2006.01)

(52) U.S. Cl.
CPC ........ *B23C 5/10* (2013.01); *B23C 2210/0492* (2013.01); *B23C 2226/27* (2013.01)

(58) Field of Classification Search
CPC .................. B23C 5/10; B23C 2226/27; B23C 2210/0492; B23C 2210/0407;
(Continued)

(56) References Cited

U.S. PATENT DOCUMENTS 3,863,316 A * 2/1975 Yeo ........................... B23C 5/10
                                                             407/54
3,913,196 A * 10/1975 Maday .................... B23B 51/08
                                                             407/54
(Continued)

FOREIGN PATENT DOCUMENTS

JP           54-119198 A      9/1979
JP           63-047007 A      2/1988
(Continued)

*Primary Examiner* — Nicole N Ramos
(74) *Attorney, Agent, or Firm* — Volpe Koenig

(57) ABSTRACT

A rotating tool according to one aspect includes a body that extends from a first end to a second end, and the body includes a second helical cutting edge, a second helical flute, a first helical cutting edge, and a first helical flute. The body further includes a reversely-helical cutting edge and a reversely-helical flute from the second helical flute. The reversely-helical cutting edge and the reversely-helical flute are helical reversely to the second helical flute from the second helical flute to the second end, and the reversely-helical flute extends along the reversely-helical cutting edge. The reversely-helical cutting edge is positioned intersecting with an extended line of a trace of the first helical cutting edge and not intersecting with an extended line of a trace of the second helical cutting edge.

6 Claims, 9 Drawing Sheets

(58) Field of Classification Search
CPC ...... B23C 2210/0485; B23C 2210/086; B23C 2210/54; B23C 3/00; B23C 3/12
See application file for complete search history.

(56) References Cited

U.S. PATENT DOCUMENTS

| | | | | | |
|---|---|---|---|---|---|
| 4,227,837 | A | * | 10/1980 | Yodoshi | B23C 5/10 407/53 |
| 4,572,714 | A | * | 2/1986 | Suzuki | B23B 51/02 407/53 |
| 7,204,663 | B2 | * | 4/2007 | Dov | B23B 51/08 407/53 |
| 9,333,565 | B2 | * | 5/2016 | Volokh | B23C 5/10 |
| 2004/0120777 | A1 | * | 6/2004 | Noland | B23C 5/10 407/63 |
| 2006/0045638 | A1 | * | 3/2006 | Flynn | B23C 5/10 407/53 |
| 2013/0259585 | A1 | * | 10/2013 | Xu | B23C 5/10 407/54 |
| 2013/0294852 | A1 | * | 11/2013 | Winebrenner | A61K 31/573 407/54 |

FOREIGN PATENT DOCUMENTS

| | | |
|---|---|---|
| JP | 04-060606 U | 5/1992 |
| JP | 2013-075355 A | 4/2013 |
| JP | 2014-079810 A | 5/2014 |
| JP | 2015-000458 A | 1/2015 |

\* cited by examiner

ROTATING TOOL

CROSS-REFERENCE TO RELATED APPLICATIONS

This application is a national stage entry according to 35 U.S.C. 371 of PCT Application No. PCT/JP2018/011052 filed on Mar. 20, 2018, which claims priority to Japanese Application No. 2017-066665 filed on Mar. 30, 2017, which are entirely incorporated herein by reference.

TECHNICAL FIELD

The present aspect relates to a rotating tool.

BACKGROUND ART

A rotating tool, which is used for cutting a laminated body containing fibers, such as carbon-fiber reinforced plastic (CFRP), is required to lower a risk that burrs and peeling are caused on a machined surface. An end mill described in JP 2015-458 A (Patent Document 1) has been known as a rotating tool of such kind. The rotating tool (the end mill) described in Patent Document 1 includes first cutting edge portions twisted in a rotational direction from a tip end side to a rear end side, first cutting flutes positioned along the first cutting edge portions, second cutting edge portions twisted in a direction opposite to the rotational direction from the tip end side to the rear end side, and second cutting flutes positioned along the second cutting edge portions.

In the case of using the rotating tool described in Patent Document 1, there may be a risk of degrading chip discharge performance. Specifically, a chip generated at the first cutting edge portion flows toward the rear end side of the rotating tool after flowing in the first cutting flute. At this time, an end portion of the first cutting flute on the rear end side of the rotating tool meets the second cutting flute, and hence the chip flowing through the first cutting flute flows in the second cutting flute. In addition to the chip described above, a chip generated at the second cutting edge portion also flows in the second cutting flute, and flows toward the tip end side of the rotating tool. At this time, an end portion of the second cutting flute on the tip end side of the rotating tool meets the other first cutting flute, and hence the chip flowing through the second cutting flute flows in the other first cutting flute. When the chip is not discharged neither to the tip end side or the rear end side of the rotating tool as described above, chip discharge performance is degraded.

SUMMARY OF INVENTION

A rotating tool according to a non-limiting aspect of the present disclosure includes a body having a columnar shape and extends from a first end to a second end, and the body includes a second helical cutting edge, a second helical flute, a first helical cutting edge, and a first helical flute in the stated order in a rotational direction about a rotational axis. The first helical cutting edge and the second helical cutting edge are helical from a side of the first end to a side of the second end, the first helical flute extends along the first helical cutting edge, and the second helical flute extends along the second helical cutting edge. The body further includes a reversely-helical cutting edge and a reversely-helical flute from the second helical flute in the stated order in the rotational direction. The reversely-helical cutting edge and the reversely-helical flute are helical reversely to the second helical flute from the second helical flute to the second end, and the reversely-helical flute extends along the reversely-helical cutting edge. The reversely-helical cutting edge is positioned intersecting with an extended line of a trace of the first helical cutting edge and not intersecting with an extended line of a trace of the second helical cutting edge.

DESCRIPTION OF EMBODIMENTS

Now, with reference to the drawings, detailed description is made on a rotating tool 1 according to non-limiting embodiments of the present disclosure. However, for convenience of description, each of the drawings referenced below may be simplified to illustrate only main members among constituent members of the embodiments. Accordingly, the rotating tool 1 may be provided with any constituent member that is not illustrated in each of the drawings referenced in this specification. Further, the dimensions of the members in each of the drawings do not faithfully represent the actual dimensions of the constituent members and the dimension ratios of each of the members.

In the embodiments of the present disclosure, an end mill may be illustrated as an example of the rotating tool 1. Note that, the rotating tool 1 is not limited to the end mill illustrated in the embodiments of the present disclosure, and may be a milling tool, for example.

Figure 1:
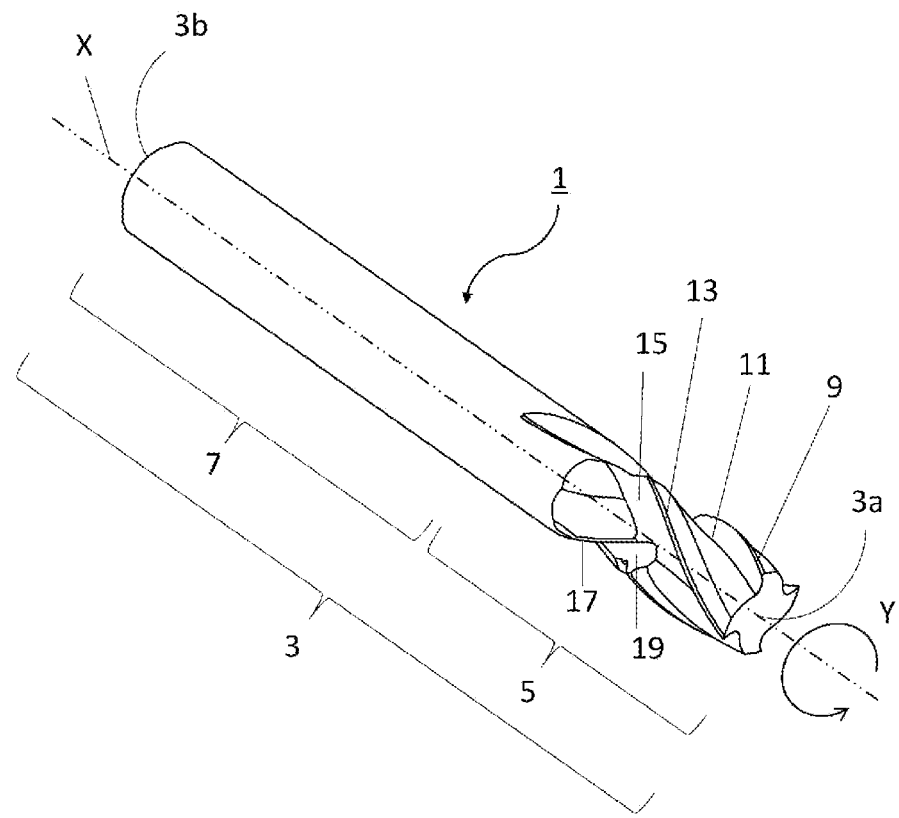
FIG. 1 is a perspective view of a rotating tool of a non-limiting embodiment of the present disclosure.

In an example in FIG. 1, the rotating tool 1 may include a columnar body 3 extending from a first end 3a to a second end 3b. The cylindrical body 3 may rotate about a rotational axis X in a direction of an arrow Y when machining a workpiece used for manufacturing a machined product.

Figure 2:
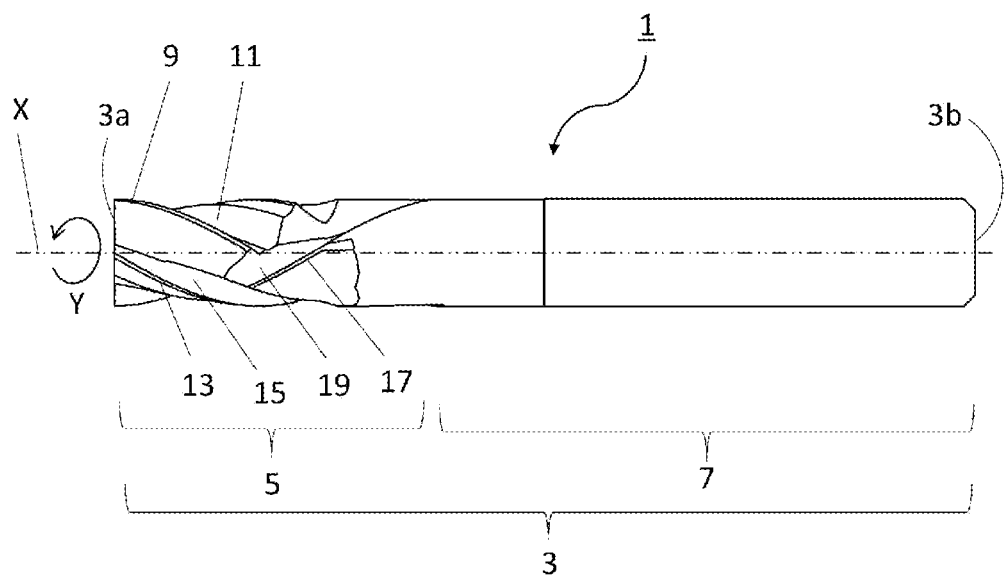
FIG. 2 is a side view of the rotating tool in FIG. 1.

In an example in FIG. 2, an end of the body 3 in left-side may be the first end 3a, and an end of the body 3 in right-side may be the second end 3b. Hereinafter, the first end 3a may be referred to as a tip end 3a, and the second end 3b may be referred to as a rear end 3b to reflect the usage condition of the rotating tool 1 during machining.

An outer diameter of the body 3 in the embodiments of the present disclosure may be set to 4 mm to 25 mm, for example. Note that, the outer diameter of the body 3 may not be necessarily required to be constant from the tip end 3a to the rear end 3b, and the body 3 may have a tapered shape in which the outer diameter of the body 3 increases from the tip end 3a toward the rear end 3b, for example. In addition, when a length of the body 3 in a direction along the rotational axis X is L and the outer diameter of the body 3 is D, the length L of the body 3 may be set to satisfy L=4D to 15D, for example.

The body 3 in the embodiments of the present disclosure may include a cutting section 5 and a shank section 7. The shank section 7 may be a part that is gripped by a rotating spindle of a machine tool (not illustrated) and may be designed in accordance with the shape of the spindle in the machine tool. Examples of the shape of the shank section 7 may include a straight shank, a long shank, a long neck, a tapered shank, and the like.

The cutting section 5 in the example in FIG. 2 may be positioned on a side of the tip end 3a with respect to the shank section 7. The cutting section 5 may include a part that comes into contact with the workpiece and plays a key role when machining a workpiece.

The body 3 may include first helical cutting edges 9, first helical flutes 11, second helical cutting edges 13, and second helical flutes 15. Specifically, in the cutting section 5 of the body 3 in the example in FIG. 1, the second helical cutting edge 13, the second helical flute 15, the first helical cutting edge 9, and the first helical flute 11 may be provided in the stated order on the outer circumference in a rotational direction Y about the rotational axis X.

Each of the first helical cutting edges 9 and the second helical cutting edges 13 may be helical from the side of the tip end 3a to the side of the rear end 3b. Specifically, each of the first helical cutting edges 9 and the second helical cutting edges 13 may be helical rearward in the rotational direction Y as approaching the side of the rear end 3b from the side of the tip end 3a.

The first helical flutes 11 may extend along the first helical cutting edges 9, and the second helical flutes 15 may extend along the second helical cutting edges 13. In the example in FIG. 1, the first helical flutes 11 may be adjacent to the first helical cutting edges 9 on the front side in the rotational direction Y. Further, the second helical flutes 15 may be adjacent to the second helical cutting edges 11 on the front side in the rotational direction Y.

In addition, the body 3 may further include reversely-helical cutting edges 17 and reversely-helical flutes 19, and the reversely-helical cutting edge 17 and the reversely-helical flute 19 may be provided in the stated order from the second helical flute 15 in the rotational direction Y. The reversely-helical cutting edges 17 and the reversely-helical flutes 19 may be helical reversely to the second helical flutes 15 from the second helical flutes 15 to the rear end 3b. Specifically, the reversely-helical cutting edges 17 may be helical frontward in the rotational direction Y as approaching the side of the rear end 3b from the second helical flutes 15.

The reversely-helical flutes 19 may extend along the reversely-helical cutting edges 17. In the example in FIG. 1, the reversely-helical flutes 19 may be adjacent to the reversely-helical cutting edges 17 on the front side in the rotational direction Y. In this case, the reversely-helical cutting edges 17 in the embodiments of the present disclosure may be positions intersecting with extended lines of traces of the first helical cutting edges 9 and not intersecting with extended lines of traces of the second helical cutting edges 13.

Each of the number of first helical cutting edges 9, the number of second helical cutting edges 13, and the number of reversely-helical cutting edges 17 may be one or plural. In an example in FIG. 6, each of the number of first helical cutting edges 9, the number of second helical cutting edges 13, and the number of reversely-helical cutting edges 17 is two. Note that, it is not required that the number of first helical cutting edges 9, the number of second helical cutting edges 13, and the number of reversely-helical cutting edges 17 match with one another, and one first helical cutting edge 9, three second helical cutting edges 13, and one reversely-helical cutting edge 17 may be provided, for example.

Figure 6:
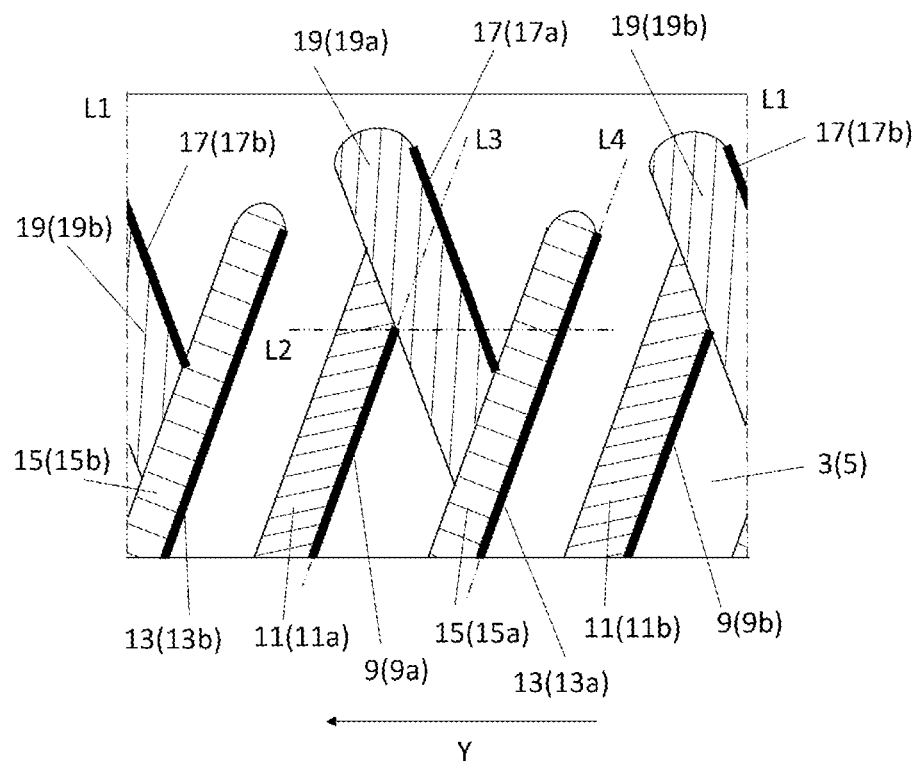
FIG. 6 is a developed view of an outline of an outer circumference of the rotating tool in FIG. 1.

Note that, FIG. 6 is a developed view of an outline of the outer circumference of the body 3 in the embodiments of the present disclosure. In FIG. 6, a lower side may correspond to the side of the tip end 3a, and an upper side may correspond to the side of the rear end 3b. Further, an imaginary line L1 positioned on each of a right end portion and a left end portion in FIG. 6 may indicate the same location on the outer circumference of the body 3. Further, to facilitate visual understanding, the first helical flutes 11, the second helical flutes 15, and the reversely-helical flutes 19 may be hatched in FIG. 6 for convenience.

The first helical flutes 11, the second helical flutes 15, and the reversely-helical flutes 19 in the embodiments of the present disclosure may be used for discharging chips, which are generated at the first helical cutting edges 9, the second helical cutting edges 13, and the reversely-helical cutting edges 17, respectively, to the outside. In the embodiments of the present disclosure, each of the number of first helical cutting edges 9, the number of second helical cutting edges 13, and the number of reversely-helical cutting edges 17 may be two, and hence each of the number of first helical flutes 11, the number of second helical flutes 15, and the reversely-helical flutes 19 may be also two.

Figure 3:
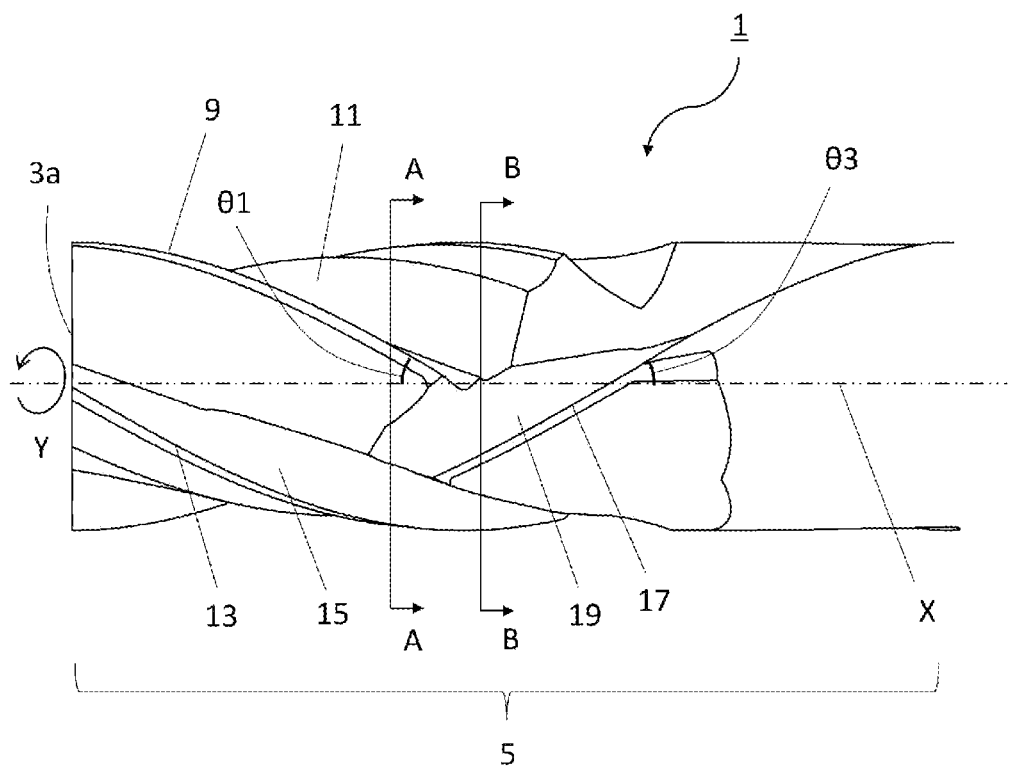
FIG. 3 is an enlarged view of a first end of the rotating tool in FIG. 2.
Figure 4:
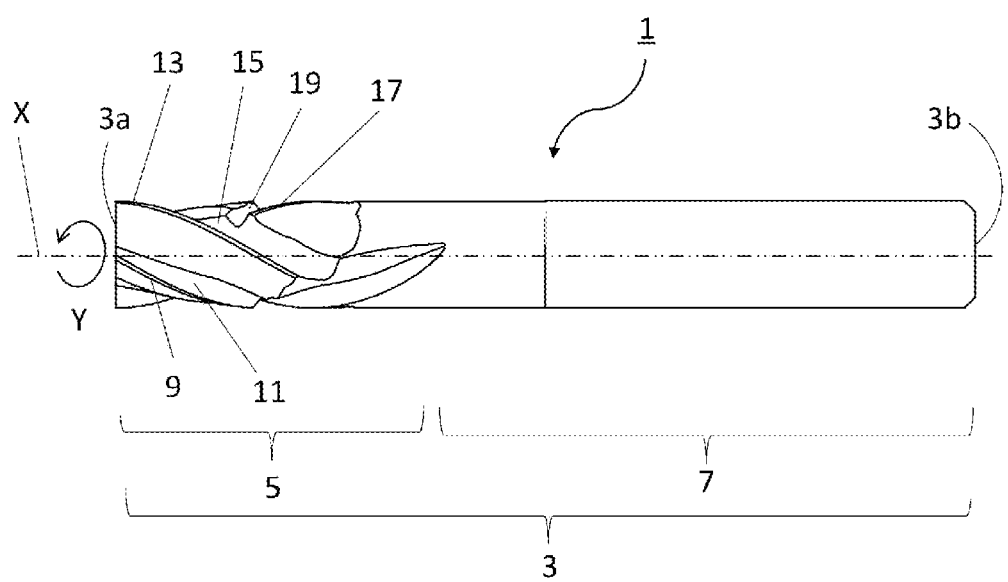
FIG. 4 is a side view of the rotating tool in FIG. 1.
Figure 5:
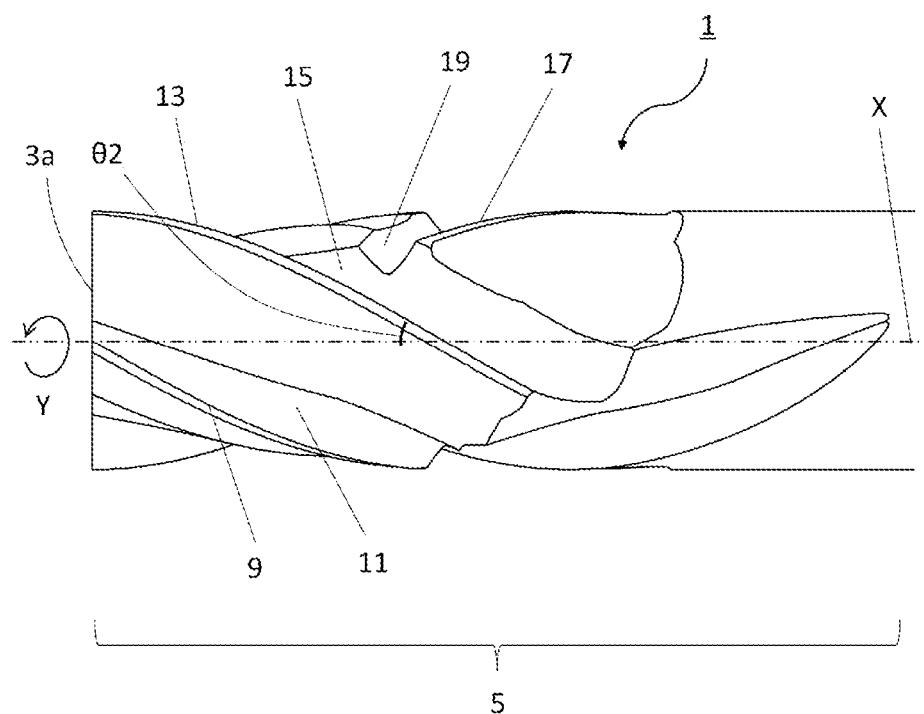
FIG. 5 is an enlarged view of the first end of the rotating tool in FIG. 4.

Helical angles of the first helical cutting edge 9, the second helical cutting edge 13, and the reversely-helical cutting edge 17, which are positioned helically on the outer circumference of the body 3, are not limited to particular values, and may be set to from 3 degrees to 45 degrees, for example. As illustrated in FIG. 3 or FIG. 5, the helical angle can be estimated with an angle formed between the first helical cutting edge 9, the second helical cutting edge 13, or the reversely-helical cutting edge 17 and the rotational axis X when the body 3 is observed in a side view.

The angles formed between the first helical cutting edge 9, the second helical cutting edge 13, and the reversely-helical cutting edge 17 and the rotational axis X may be denoted with $\theta 1$, $\theta 2$, and $\theta 3$, respectively, and may be illustrated in FIG. 3 or FIG. 5. In addition, the helical angles may be constant from the side of the tip end 3a to the side of the rear end 3b, or may change partway.

In a case where each of the helical angles $\theta 1$, $\theta 2$, and $\theta 3$ is constant, for example, the first helical cutting edges 9, the second helical cutting edges 13, and the reversely-helical cutting edges 17, which are positioned helically on the outer circumference of the body 3, may be indicated linearly when illustrated in the developed view of the outer circumference of the body 3.

In the example in FIG. 6, the first helical cutting edges 9, the second helical cutting edges 13, and the reversely-helical cutting edges 17 may be linear, and hence the extended lines of the traces of those cutting edges may be indicated with linear extended lines. Note that, when the first helical cutting edges 9 have a curved shape, for example, the extended lines of the traces described above may be estimated with imaginary lines, which are positioned on tangent lines held in contact with the end portions of the first helical cutting edges 9 on the side of the second end 3b and extend from the end portions described above to the side of the second end 3b. Further, in a case where the second helical cutting edges 13 have a curved shape, for example, estimation may be performed similarly.

When the second helical cutting edge 13, the second helical flute 15, the reversely-helical cutting edge 17, the reversely helical flute 19, the first helical cutting edge 9, and the first helical flute 11 arrayed in the stated order in the rotational direction Y about the rotational axis X forms one machining region, the body 3 in the example in FIG. 6 may include a machining region (a first machining region), which is formed of a first helical cutting edge 9a, a first helical flute 11a, a second helical cutting edge 13a, a second helical flute 15a, a reversely-helical cutting edge 17a, and a reversely-helical flute 19a, and a machining region (a second machining region), which is formed of a first helical cutting edge 9b, a first helical flute 11b a second helical cutting edge 13b, a second helical flute 15b, a reversely-helical cutting edge 17b, and a reversely-helical flute 19b.

As illustrated in FIG. 6, in the rotating tool 1 according to the embodiments of the present disclosure, the reversely-helical cutting edge 17a may be positioned intersecting with an extended line L3 of a trace of the first helical cutting edge 9a and not intersecting with an extended line L4 of a trace of the second helical cutting edge 13a. Thus, the rotating tool 1 according to the embodiments of the present disclosure may exert satisfactory chip discharge performance.

Specifically, first, a chip generated at the first helical cutting edge 9a may flow in the first helical flute 11a. Then, the chip may flow through the first helical flute 11a toward the side of the rear end 3b. The end portion of the first helical flute 11a on the side of the rear end 3b may meet the reversely-helical flute 19a, and hence the chip may flow from the first helical flute 11a to the reversely-helical flute 19a.

A chip generated at the reversely-helical cutting edge 17a may flow in the reversely-helical flute 19a, and may flow through the reversely-helical flute 19a toward the side of the tip end 3a together with the chip flowing from the first helical flute 11a. At this time, the end portion of the reversely-helical flute 19a on the side of the tip end 3a may meet the second helical flute 15a, and hence the chip may flow from the reversely-helical flute 19a to the second helical flute 15a.

A chip generated at the second helical cutting edge 13a may flow in the second helical flute 15a, and may flow through the second helical flute 15a toward the side of the rear end 3b together with the chip flowing from the reversely-helical flute 19a. At this time, the end portion of the second helical flute 15a on the side of the rear end 3b may not meet the reversely-helical flute 19a, and hence the chip flowing in the second helical flute 15a may not flow in the reversely-helical flute 19a, and may be more likely to be discharged to the outside from the side of the rear end 3b of the body 3. Therefore, the rotating tool 1 according to the embodiments of the present disclosure may exert satisfactory chip discharge performance with less chip clogging.

Further, in the example in FIG. 6, the reversely-helical cutting edge 17a included in the first machining region may be positioned not intersecting with an extended line of a trace of the second helical cutting edge 13b included in the second machining region as well as that of the second helical cutting edge 13a included in the first machining region. Further, the reversely-helical cutting edge 17b included in the second machining region may be positioned not intersecting with the extended line of the trace of the second helical cutting edge 13a in the first machining region as well as that of the second helical cutting edge 13b included in the second machining region.

In a case where the reversely-helical cutting edge 17a in the first machining region and the reversely-helical cutting edge 17b in the second machining region are configured as described above, each of the chips flowing in the second helical flutes 15a and 15b may be discharged satisfactorily from the side of the rear end 3b of the body 3.

Figure 8:
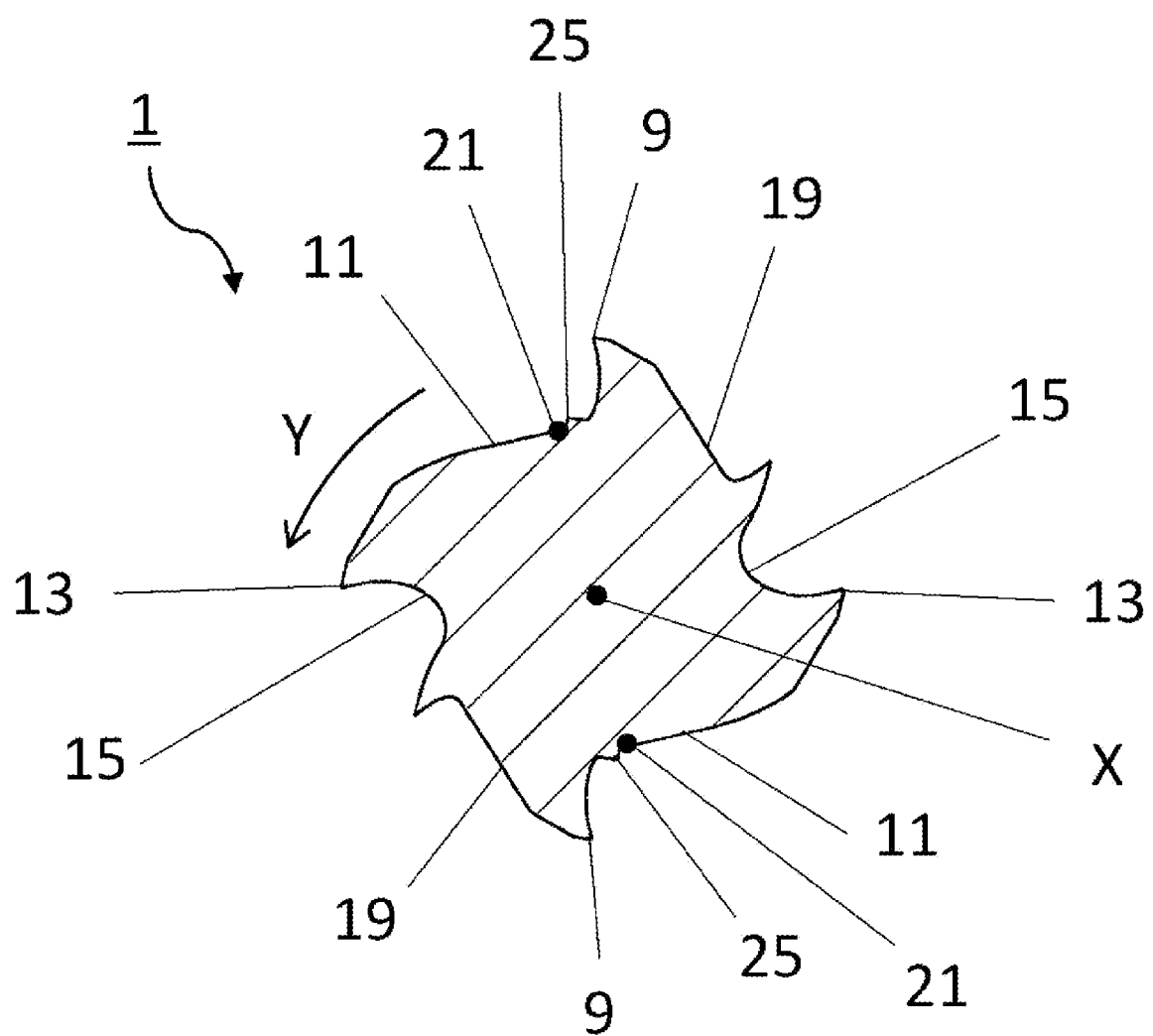
FIG. 8 is a cross-sectional view of the A-A cross section in FIG. 3.

In an example in FIG. 8, the first helical flutes 11 may include first bottom portions 21 being bottoms of the first helical flutes 11. The first bottom portions 21 may extend from the side of the tip end 3a to the side of the rear end 3b. Although not particularly illustrated, the distance between the first bottom portion 21 and the rotational axis X may not be constant from the side of the tip end 3a to the side of the rear end 3b.

Further, at least a part of the first bottom portion 21 may include a part having a long distance from the rotational axis X. When the first bottom portion 21 includes a part having a long distance from the rotational axis X, it can be described, in other words, that the first helical flute 11 may include a part having a small flute depth. The part of the first bottom portion 21, which has a long distance from the rotational axis X, may be referred to as a first part for convenience. Note that, in a case where distances from the rotational axis X to two different points of the first bottom portion 21, which have different distances from the tip end 3a, are compared, when one distance is larger than the other, a part having the one distance can be referred to as the first part.

When the first bottom portion 21 includes the first part, the chip flowing through the first helical flute 11 may be less liable to flow through the first helical flute 11 toward the side of the tip end 3a. Thus, chip discharge performance may be improved.

In the case where the first bottom portion 21 includes the first part, the position of the first part may not be particularly limited. For example, when the first bottom portion 21 includes the first part positioned on the side of the rear end 3b, the chip is further less liable to flow through the first helical flute 11 toward the side of the tip end 3a. Thus, chip discharge performance may be further improved.

Further, in a case where the first part includes the end portion of the first helical flute 11 on the side of the rear end 3b, the chip flowing through the reversely-helical flute 19 may be less liable to reversely flow through the first helical flute 11. Thus, chip discharge performance may be further improved. Particularly, in a case where the distance from the rotational axis X to the first bottom portion 21 is longest at the end portion of the first helical flute 11 on the side of the rear end 3b, chip discharge performance may be further improved.

Figure 9:
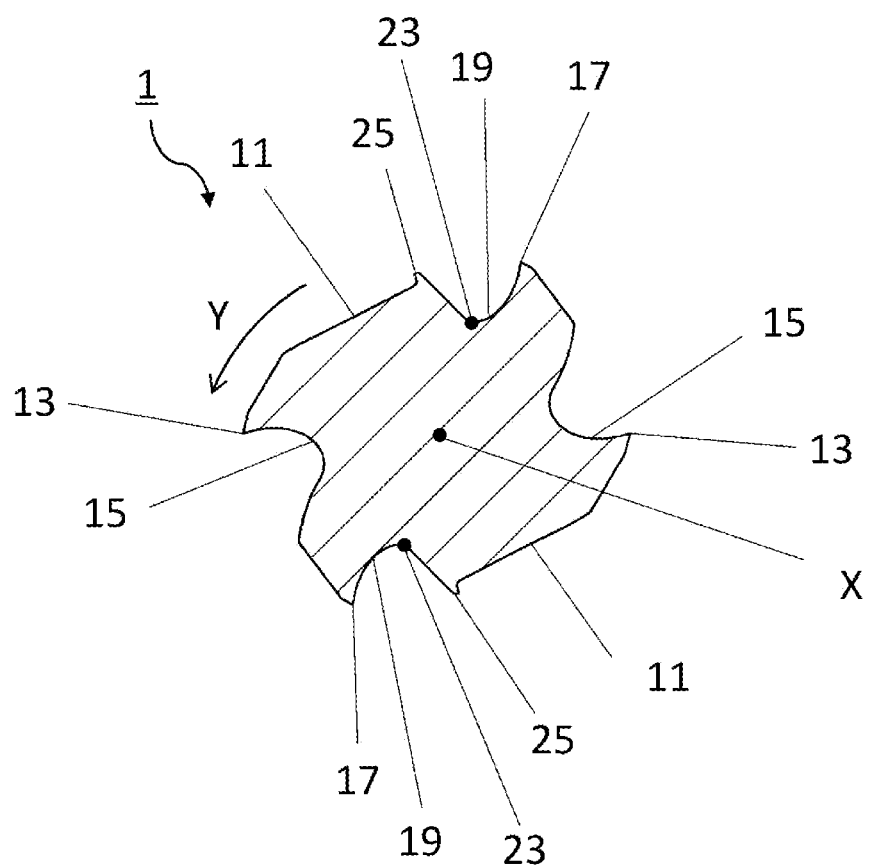
FIG. 9 is a cross-sectional view of the B-B cross section in FIG. 3.

In an example in FIG. 9, the reversely-helical flutes 19 may include second bottom portions 23 being the bottoms of the reversely-helical flutes 19. The second bottom portions 23 may extend from the side of the tip end 3a to the side of the rear end 3b. Although not particularly illustrated, the distance between the second bottom portion 23 and the rotational axis X may not be constant from the side of the tip end 3a to the side of the rear end 3b.

As a configuration in which the first bottom portion 21 includes the first part, the following configuration may be specifically exemplified.

First, the first bottom portions 21 may include the first region located on the side of the tip end 3a and the second region located on the side of the rear end 3b with respect to the first region. A distance in the first region from the rotational axis X may be referred to as a first distance, and a distance in the second region from the rotational axis X may be referred to as a second distance. At this time, in a case where the first distance and the second distance are different from each other, a region including a larger distance of the first distance and the second distance may correspond to the first part. For example, in a case where the second distance is larger than the first distance, the second region may correspond to the first part. The first bottom portions 21 may be configured as described above.

Further, secondly, the distance from the rotational axis X to the first bottom portion 21 may be configured to be increased as approaching the side of the rear end 3b from the side of the tip end 3a. As described above, the first bottom portion 21 may have a configuration without a part having a constant distance from the rotational axis X. In this case, a region including at least the end portion of the first bottom portion 21 on the side of the rear end 3b may correspond to the first part.

Note that, as a matter of course, the configuration in which the first bottom portion 21 includes the first part is not limited to the above-mentioned configuration.

Further, the second bottom portion 23 may include a part having a long distance from the rotational axis X, at at least a part thereof. When the second bottom portion 23 includes a part having a long distance from the rotational axis X, it can be described, in other words, that the reversely-helical flute 19 includes a part having a small flute depth. The part of the second bottom portion 23, which has a long distance from the rotational axis X, may be referred to as a second part for convenience. Note that, in a case where distances from the rotational axis X to two different points of the second bottom portion 23, which have different distances from the tip end 3a, are compared, when one distance is larger than the other, a part having the one distance can be referred to as the second part.

When the second bottom portion 23 includes the second part, the chip flowing through the reversely-helical flute 19 may be less liable to flow through the reversely-helical flute 19 toward the side of the rear end 3b. Thus, chip discharge performance may be improved.

In the case where the second bottom portion 23 includes the second part, the position of the second part may not be particularly limited. For example, when the second bottom portion 23 includes the second part positioned on the side of the tip end 3a, the chip may be further less liable to flow through the reversely-helical flute 19 toward the side of the rear end 3b. Thus, chip discharge performance may be further improved.

Further, in a case where the second part includes the end portion of the reversely-helical flute 19 on the side of the tip end 3a, the chip flowing through the second helical flute 15 may be less liable to reversely flow through the reversely-helical flute 19. Thus, chip discharge performance may be further improved. Particularly, in a case where the distance from the rotational axis X to the second bottom portion 23 is longest at the end portion of the reversely-helical flute 19 on the side of the tip end 3a, chip discharge performance may be further improved.

When the body 3 is observed in a side view, the reversely-helical cutting edge 17 may overlap with an orthogonal line with the rotational axis X at the end portion of the first helical cutting edge 9 on the side of the rear end 3b. In other words, the first helical cutting edge 9 and the reversely-helical cutting edge 17 may overlap in the rotational direction Y of the rotational axis X.

Specifically, in the example in FIG. 6, an imaginary line L2, which passes through the end portion of the first helical cutting edge 9 on the side of the rear end 3b and extends in a direction orthogonal to the rotational axis X (the right-and-left direction in FIG. 6) may intersect with the reversely-helical cutting edge 17. When the reversely-helical cutting edges 17 are configured as described above, incomplete machining may be less liable to be caused during machining. Thus, the machining surface of the workpiece may be satisfactory.

As illustrated in FIG. 8 and FIG. 9, the first helical flutes 11 may include first ridges 25 extending from the side of the tip end 3a to the side of the rear end 3b. When chips flow through the first helical flutes 11, the first ridges 25 can function as guides that guide the chips. Thus, chip discharge performance may be satisfactory.

Figure 7:
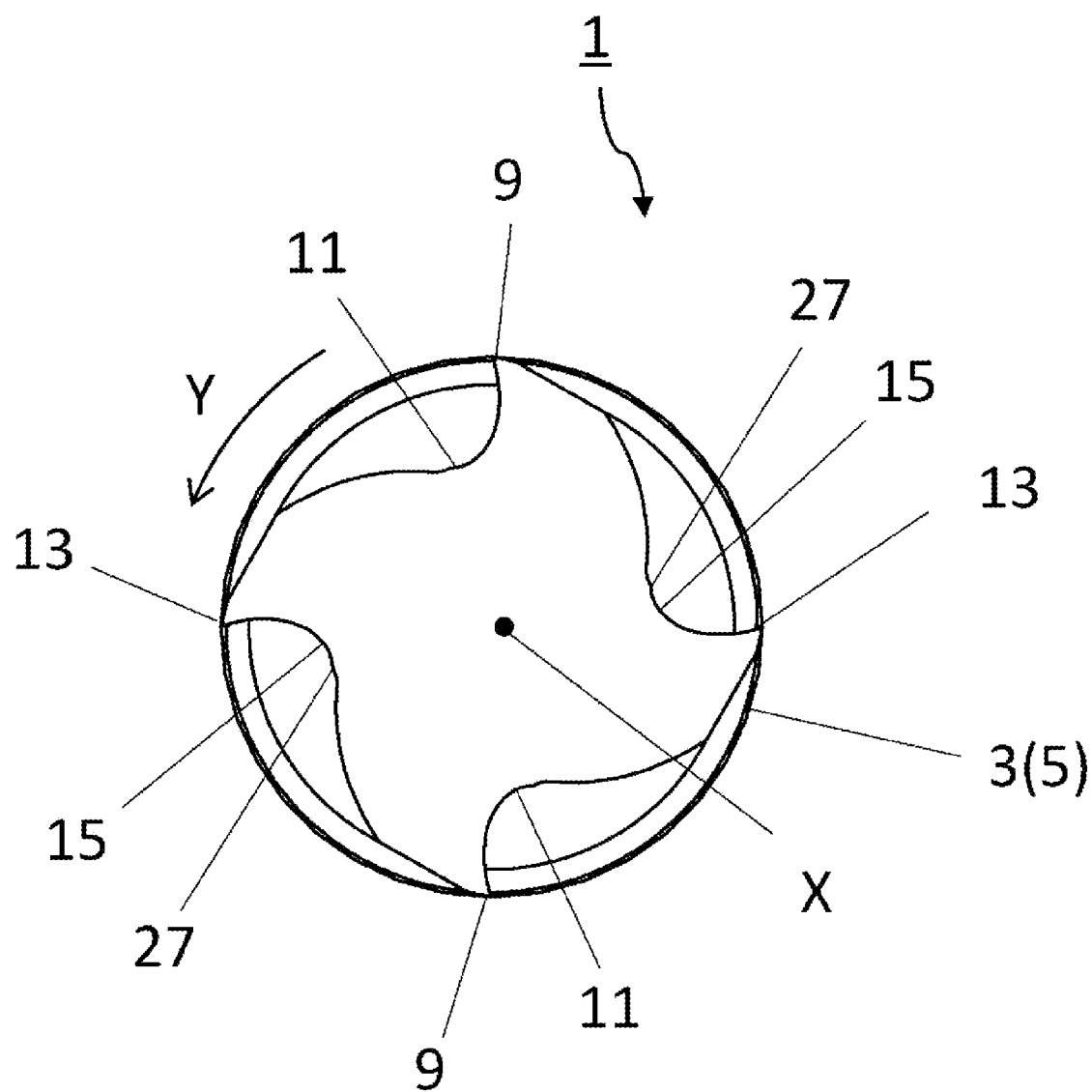
FIG. 7 is a front view of the rotating tool in FIG. 1.

As illustrated in FIG. 7, the second helical flutes 15 may include second ridges 27 extending from the side of the tip end 3a to the side of the rear end 3b. When chips flow through the second helical flutes 15, the second ridges 27 can function as guides that guide the chips. Thus, chip discharge performance may be satisfactory.

In the example in FIG. 6, the body 3 may include the second helical cutting edge 13a, which is positioned on the back side in the rotational direction Y with respect to the first helical cutting edge 9a, and the second helical cutting edge 13b, which is positioned on the front side in the rotational direction Y with respect to the first helical cutting edge 9a. At this time, an interval between the first helical cutting edge 9a and the second helical cutting edge 13a may be larger than an interval between the first helical cutting edge 9a and the second helical cutting edge 13b.

In general, with regard to machining performed by a rotating tool, a size (thickness) of a chip may be smaller as an interval between cutting edges adjacent to each other in a rotating direction is smaller. Thus, in the case where the first helical cutting edge 9 and the second helical cutting edge 13 are positioned as described above, a size of a chip generated at the first helical cutting edge 9 may be smaller than a chip generated at the second helical cutting edge 13. A size of a chip generated at the first helical cutting edge 9 may be relatively small, and hence chip clogging due to a cause described later may be suppressed.

A chip generated at the second helical cutting edge 13 may flow through the second helical flute 15, and may be discharged to the outside. Meanwhile, a chip generated at the first helical cutting edge 9 may flow through the first helical flute 11, the reversely-helical flute 19, and the second helical flute 15 in the stated order, and may be finally discharged to the outside. That is, a chip generated at the second helical cutting edge 13 may flow through one flute whereas a chip generated at the first helical cutting edge 9 flows through three flutes and may be discharged.

At this time, in the case where the first helical cutting edge 9a, the second helical cutting edge 13a, the second helical cutting edge 13b are configured as described above, a chip generated at the first helical cutting edge 9, which is discharged to the outside through a long pathway, may be small, and hence chip clogging may be less liable to be caused.

Examples of the material of the body 3 may include cemented carbide alloy, cermet, or the like. Examples of the composition of the cemented carbide alloy may include WC—Co, WC—TiC—Co, and WC—TiC—TaC—Co. Here, WC, TiC, and TaC may be hard particles, and Co may be a binder phase. In addition, the cermet may be a sintered composite material obtained by combining a metal with a ceramic component. Specifically, examples of the cermet may include titanium compounds in which one of titanium carbide (TiC) and titanium nitride (TiN) may be the main component.

The surface of the body 3 may be coated with a coating film by using one of a chemical vapor deposition (CVD) method and a physical vapor deposition (PVD) method. Examples of the composition of the coating film may include titanium carbide (TiC), titanium nitride (TiN), titanium carbonitride (TiCN), alumina ($Al_2O_3$), and the like.

Method for Manufacturing Machined Product

Next, a method for manufacturing a machined product of non-limiting embodiments of the present disclosure may be described in detail by exemplifying the case where the rotating tool 1 according to the above-mentioned embodiments may be used. Now, with reference to FIG. 10 to FIG. 12, description may be given.

The manufacturing method may include:

(1) rotating the rotating tool 1 exemplified by the above-mentioned embodiments around the rotational axis X;

(2) bringing at least one of the first helical cutting edges, the second helical cutting edges, and the reversely-helical cutting edges of the rotating tool 1 that is rotating into contact with a workpiece 33, and (3) separating the rotating tool 1 from the workpiece 33.

Figure 10:
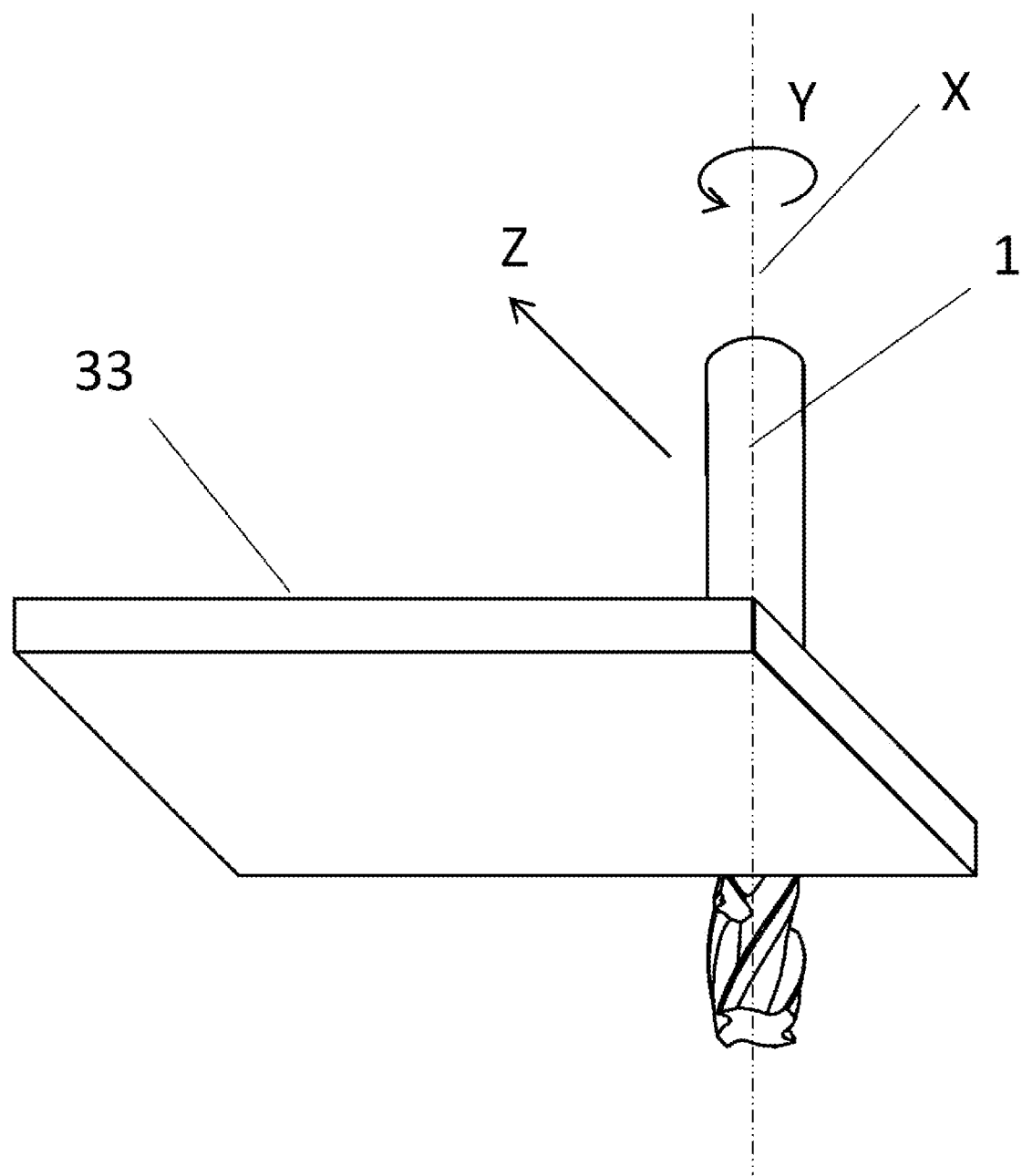
FIG. 10 is a view of a step in a method for manufacturing a machined product in a non-limiting embodiment of the present disclosure.
Figure 11:
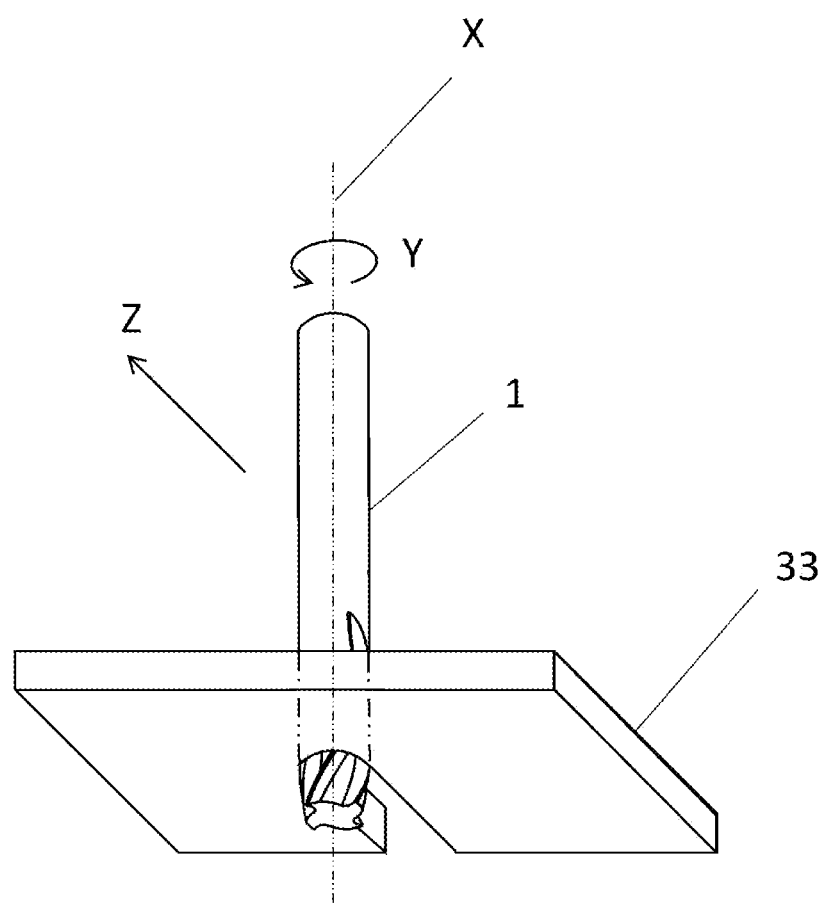
FIG. 11 is a view of a step in the method for manufacturing a machined product in a non-limiting embodiment of the present disclosure.
Figure 12:
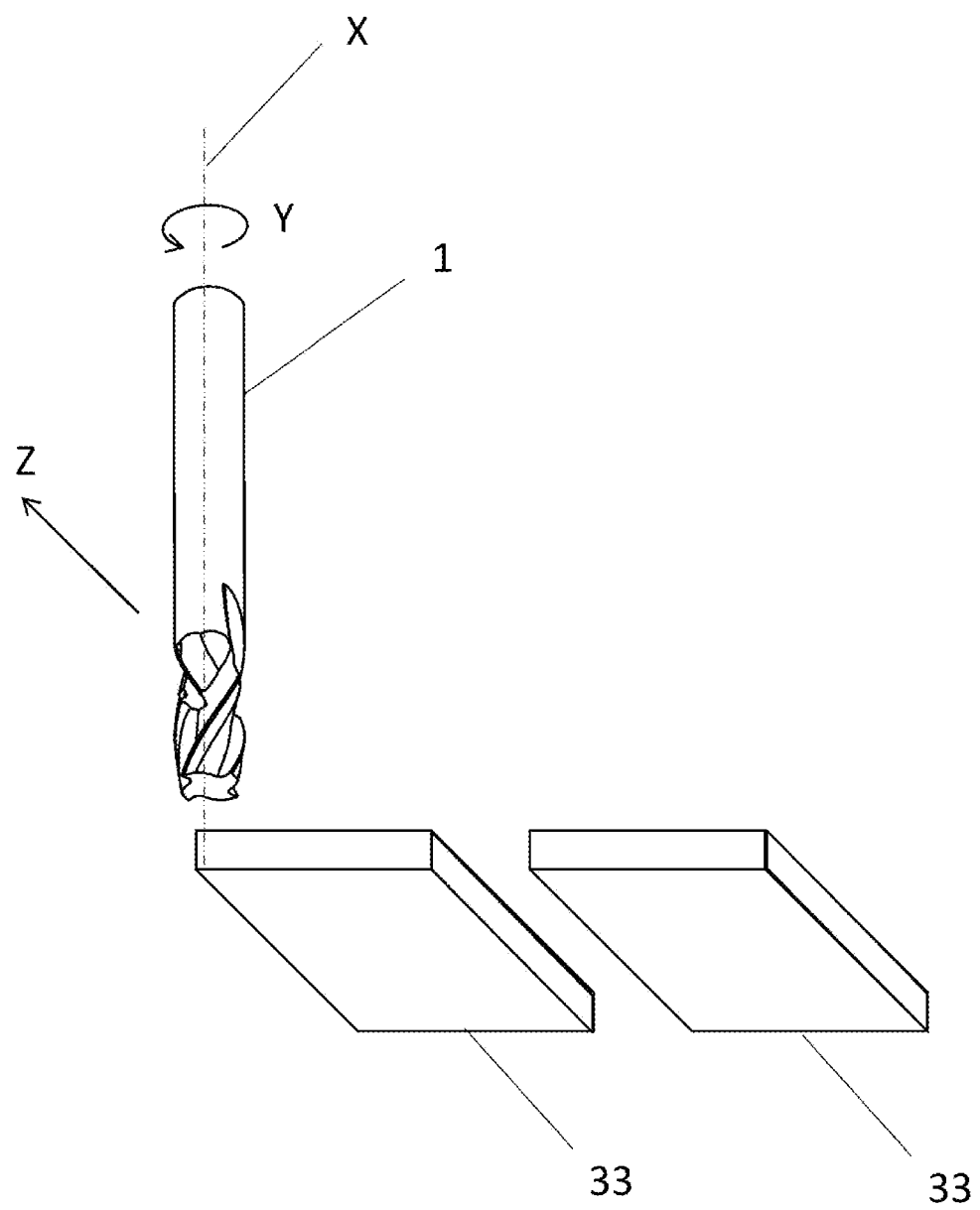
FIG. 12 is a view of a step in the method for manufacturing a machined product in a non-limiting embodiment of the present disclosure.

More specifically, first, as illustrated in FIG. 10, by rotating the rotating tool 1 about the rotational axis X while moving the rotating tool 1 in a Z direction orthogonal to the rotational axis X, the rotating tool 1 may be brought relatively close to the workpiece 33. Next, as illustrated in FIG. 11, at least one of the first helical cutting edges, the second helical cutting edges, and the reversely-helical cutting edges of the rotating tool 1 may be brought into contact with the workpiece 33 to cut the workpiece 33. Note that, in FIG. 11, the first helical cutting edges, the second helical cutting edges, and the reversely-helical cutting edges may be brought into contact with the workpiece 33. Then, as illustrated in FIG. 12, by moving the rotating tool 1 further in the Z direction, the rotating tool 1 may be relatively moved away from the workpiece 33.

In the embodiments of the present disclosure, under a state in which the workpiece 33 is fixed and the rotating tool 1 rotates about the rotational axis X, the rotating tool 1 may be brought close to the workpiece 33. In addition, in FIG. 11, the workpiece 33 may be cut by being brought into contact with the first helical cutting edges, the second helical cutting edges, and the reversely-helical cutting edges of the rotating tool 1 that is rotating. Further, in FIG. 12, the rotating tool 1 in the rotating state may be moved away from the workpiece 33.

Note that, during machining in the manufacturing method according to the embodiments of the present disclosure, in each of the steps, the rotating tool 1 may be brought into contact with or separated from the workpiece 33 by moving the rotating tool 1. However, as a matter of course, the cut processing is not limited to such a mode.

For example, in step (1), the workpiece 33 may be brought close to the rotating tool 1. In the same manner, in step (3), the workpiece 33 may be moved away from the rotating tool 1. When machining is to be continued, a step of bringing any one of the first helical cutting edges, the second helical cutting edges, and the reversely-helical cutting edges into contact with a different position on the workpiece 33 may be repeated while maintaining the rotating state of the rotating tool 1.

Note that, in FIG. 11, the rotating tool 1 may be moved along the Z direction, but the present disclosure is not limited to this aspect. For example, cutting may be performed while moving the rotating tool 1 in the direction along the rotational axis X.

Here, representative examples of the material of the workpiece 33 may include aluminum, carbon steel, alloy steel, stainless steel, cast iron, non-ferrous metals, and the like.

Reference Signs List
1 Rotating tool
3 Body
3a First end (tip end)
3b Second end (rear end)
5 Cutting section
7 Shank section
9 First helical cutting edge
11 First helical flute
13 Second helical cutting edge
15 Second helical flute
17 Reversely-helical cutting edge
19 Reversely-helical flute
21 First bottom portion
23 Second bottom portion
25 First ridge
27 Second ridge
33 Workpiece
X Rotational axis
Y Rotational direction
Z Cutting direction

The invention claimed is:

1. A rotating tool, comprising:
a body having a columnar shape, extending along a rotational axis from a first end to a second end, and comprising:
a cutting section having the first end, and
a shank section having the second end, wherein
the cutting section comprises:
a first helical flute extending from a side of the first end to a side of the second end and being helical rearward in a rotational direction of the rotational axis as approaching the side of the second end,
a first helical cutting edge located along the first helical flute on a back side in the rotational direction,
a second helical flute located rearward in the rotational direction from the first helical cutting edge and being helical rearward in the rotational direction as approaching the side of the second end,
a second helical cutting edge located along a back side of the second helical flute on the back side in the rotational direction,
a first reversely-helical flute extending from the second flute to the side of the second end and being helical forward in the rotational direction as approaching the side of the second end,
a first reversely-helical cutting edge located along the first reversely-helical flute on the back side in the rotational direction, forward of the second helical cutting edge in the rotational direction and adjacent to the second helical cutting edge, and
a second reversely-helical cutting edge located behind the second helical cutting edge in a rotational direction and adjacent to a third helical cutting edge, wherein
the first reversely-helical cutting edge intersects to an extended line of the first helical cutting edge, and does not intersect to an extended line of the second helical cutting edge, and
the first reversely-helical flute includes a portion located closer to the second end than to an end portion of the first helical flute on the side of the second end,
wherein the reversely-helical cutting edge intersects to an orthogonal line with the rotational axis at an end portion of the first helical cutting edge on the side of the second end in a side view,
and wherein neither the first reversely-helical cutting edge nor the second reversely-helical cutting edge intersects an extended line of the second helical cutting edge.

2. The rotating tool according to claim 1, wherein
the first helical flute comprises:
   a first bottom portion located at a bottom of the first helical flute, and
   a second bottom portion located at the bottom of the first helical flute, and
the first bottom portion is farther from the rotational axis than the second bottom portion.

3. The rotating tool according to claim 1, wherein
the first reversely-helical flute comprises:
   a third bottom portion located at a bottom of the reversely-helical flute, and
   a fourth bottom portion located at the bottom of the reversely-helical flute, and
the third bottom portion is farther from the rotational axis than the fourth bottom portion.

4. The rotating tool according to claim 1, wherein the first helical flute comprises a first ridge extending from the side of the first end to the side of the second end.

5. The rotating tool according to claim 1, wherein the second helical flute comprises a second ridge extending from the side of the first end to the side of the second end.

6. The rotating tool according to claim 1, wherein
the body further comprises a fourth helical cutting edge on a front side of the first helical cutting edge in the rotation direction, and
an interval between the first helical cutting edge and the second helical cutting edge is larger than an interval between the first helical cutting edge and the fourth helical cutting edge.

* * * * *